US010083465B2

(12) United States Patent
Pashkevich et al.

(10) Patent No.: US 10,083,465 B2
(45) Date of Patent: Sep. 25, 2018

(54) ALLOCATING INFORMATION FOR CONTENT SELECTION AMONG COMPUTING RESOURCES OF AN ONLINE SYSTEM

(71) Applicant: Facebook, Inc., Menlo Park, CA (US)

(72) Inventors: Uladzimir Pashkevich, Mountain View, CA (US); Andrew John Tulloch, San Francisco, CA (US); Dmytro Dzhulgakov, Menlo Park, CA (US); Lars Seren Backstrom, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 154 days.

(21) Appl. No.: 14/019,794

(22) Filed: Sep. 6, 2013

(65) Prior Publication Data

US 2015/0073920 A1 Mar. 12, 2015

(51) Int. Cl.
*G06F 17/30* (2006.01)
*G06Q 30/02* (2012.01)
*H04W 4/21* (2018.01)
*H04W 4/20* (2018.01)

(52) U.S. Cl.
CPC ........ *G06Q 30/0275* (2013.01); *H04W 4/206* (2013.01); *H04W 4/21* (2018.02)

(58) Field of Classification Search
CPC ................... G06Q 30/0275; G06Q 30/02
USPC ........................................ 705/14.71
See application file for complete search history.

(56) References Cited

U.S. PATENT DOCUMENTS

| | | | | |
|---|---|---|---|---|
| 8,498,995 B1* | 7/2013 | Gond | ...................... | H04L 12/58 707/713 |
| 2004/0194095 A1* | 9/2004 | Lumb | .................. | G06F 9/4887 718/100 |
| 2004/0255034 A1* | 12/2004 | Choi | ............................ | 709/229 |
| 2007/0271335 A1* | 11/2007 | Bostick | ............... | G06Q 10/107 709/204 |
| 2008/0065718 A1* | 3/2008 | Todd et al. | ................... | 709/203 |
| 2013/0204931 A1* | 8/2013 | Sakurai et al. | ............... | 709/203 |
| 2014/0270472 A1* | 9/2014 | Hyde et al. | ................... | 382/147 |

OTHER PUBLICATIONS

"'Cut Me Some Slack': Latency-Aware Live Migration for Databases", by Sean Barker et al. Published in: Proceeding EDBT 2012 Proceedings of the 15th International Conference on Extending Database Technology, Mar. 30, 2012, pp. 432-443.*

* cited by examiner

*Primary Examiner* — Alex Gofman
(74) *Attorney, Agent, or Firm* — Fenwick & West LLP

(57) ABSTRACT

When an online system receives a request to present content items to a user, a content selection system included in the online system selects content items for presentation to the user during a latency period from the time the request was received until the time when the content items are sent. A feedback control mechanism communicates with each computing device of the content selection system to determine the latency period of each computing device. The feedback control mechanism also determines a target latency period in which content items are selected. By comparing the latency period of each computing device to the target latency period, an amount of information to be evaluated by each computing device is determined based on whether a computing device's latency period is greater than or less than the target latency period.

10 Claims, 2 Drawing Sheets

ALLOCATING INFORMATION FOR CONTENT SELECTION AMONG COMPUTING RESOURCES OF AN ONLINE SYSTEM

BACKGROUND

This disclosure relates generally to online systems, and in particular to selection and presentation of content on an online system.

An online system, such as a social networking system, allows users to connect to and communicate with other online system users. A user creates a profile on an online system that is tied to its identity and includes information about the user, such as interests and demographic information. Additionally, the online system receives or generates content items associated with one or more users. For example, the online system receives advertisements from one or more users, generates stories describing actions performed by one or more users, or receives information describing events attended by one or more users. The online system maintains the content items and presents users with one or more content items when the users access the online system.

Presenting commercial content items, such as advertisements, to users allows the online system to obtain revenue by charging advertisers when a user views or interacts with a commercial content item associated with an advertiser. Similarly, presenting non-commercial content items, such as stories or status updates, promotes user engagement with the online system. Increasing user engagement with the online system increases the number of opportunities to obtain revenue by presenting users with commercial content items, such as advertisements.

Presenting a user with content items more relevant to the user (i.e., presenting the user with higher-quality content items) increases both revenue for the online system and user interaction with the online system. Conventionally, online systems use a content selection system applying targeting or filtering rules to various content items for selecting content items to present to a user. For example, the content selection system ranks content items through an auction process or other suitable process. The content selection system selects content items for presentation during a latency period, which begins when a request for content is received by the online system and ends when the selected content items are presented to a user. The duration of the latency period depends on one or more content selection parameters, such as the number of advertisements to be ranked and may also depend on changes in traffic on the online system. Various factors may affect the traffic on the online system, such as time of day, occurrence of events, unexpected events, or other factors causing fluctuations in the demand placed on computing resources of the online system.

While the quality of content selected for presentation generally increases as the number of content items evaluated by the online system's content selection process increases, the latency period also increases for evaluating the increased number of content items using limited computing resources of an online system during periods of high user demand. Thus, when the online system evaluates a large number of content items, the quality of presented content items improves, while system performance declines. Because limited computing resources evaluate content items, increasing the number of content items evaluated causes a decline in system performance, which results in a long latency period, system delays and possible network time-outs. Conversely, if the online system evaluates a small number of content items, the latency period is shorter, which improves system performance, while the quality of presented content declines. This variation in latency period and content quality degrades a user's overall experience with a conventional online system, which undermines an online system's potential for increased user engagement and revenue.

SUMMARY

To improve the quality of content items presented to users of an online system, an online system applies a feedback control mechanisms to various computing devices used to select content items for presentation to a user. For example, the feedback control mechanism is applied to each computing device used to select content items. The feedback control mechanism maximizes the number of content items evaluated during a target latency period by distributing content items for evaluation among the computing devices available for carrying out the selection. To determine the target latency period in which to complete selection of content items, the online system periodically samples latency periods from each of multiple computing devices (e.g., processors) that select content items for presentation.

The feedback control mechanism periodically samples latency periods of multiple devices that select content items for presentation are periodically sampled and compares the sampled latency periods to the target latency period. For example, the feedback control mechanism is a proportional integral derivative ("PID") controller, or other suitable feedback mechanism determining a difference between measured latency periods and the target latency period. For a computing device with a latency period less than the target latency period, the feedback control mechanism increases the number of content items evaluated by the computing device until the latency period of the computing device reaches the target latency period. Conversely, for a computing device with a latency period greater than the target latency period, the feedback control mechanism decreases the number of content items evaluated by the computing device until the latency period of the device reaches the target latency period.

Applying the feedback control mechanism allows the only system to modify use of computing resources to analyze one or more parameters used to select content items. Evaluating various parameters may increase the quality of the content items for presentation at the expense of increased use of computing resources (e.g., ranking an increased number of content items, applying an increased number of filtering/targeting rules applied) for selecting content items. In one embodiment, the feedback control mechanism individually increases the number of content items evaluated for various users (e.g., increasing the number of content items evaluated for display to users that have historically interacted with at least a threshold percentage of presented content items).

Figure 1:
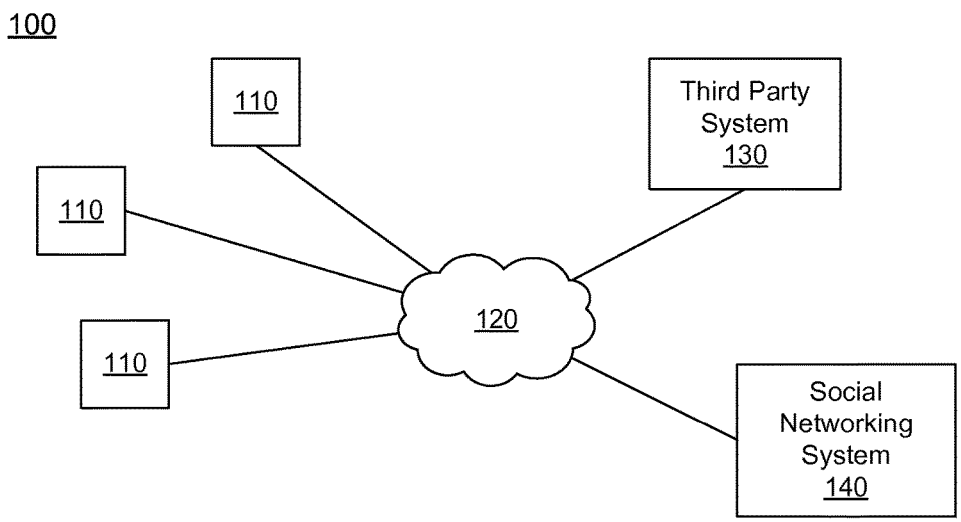
FIG. 1 is a block diagram of a system environment in which an online system operates, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

An online system provides various content items to its users. For example, the online system presents advertisements, stories describing actions by other online system, or other content items to a user. Presenting commercial content items, such as advertisements, allows the online system to obtain revenue by charging advertisers associated with commercial content items for presentation, while presenting non-commercial content items increases user interaction with the online system. Increasing user interaction with the online system provides the online system with additional opportunities to present commercial content items and obtain revenue.

Additionally, the subjective quality of content items presented to a user affect the user's level of interaction with the online system. The quality of content items presented to a user measures the relevance of the content items to the users presented with the content item. Content items more relevant to a user are higher-quality content items that are more likely to prompt the user to interact with the online system. Thus, as the relevance of presented content items to a user increases, the user's engagement with the online system increases, which provides the online system with additional opportunities to earn revenue through presentation of commercial content items.

To improve the quality of content items presented to users of an online system, an online system applies a feedback control mechanisms to various computing devices used to select content items for presentation to a user. For example, the feedback control mechanism is applied to each computing device used to select content items. The feedback control mechanism maximizes the number of content items evaluated during a target latency period by distributing content items for evaluation among the computing devices available for carrying out the selection. To determine the target latency period in which to complete selection of content items, the online system periodically samples latency periods from each of multiple computing devices (e.g., processors) that select content items for presentation.

The feedback control mechanism may be applied to one or more parameters used for evaluating content items for presentation to provide higher-quality content items that are more closely tailored to a user's interests, which provides the online system with increased opportunities to obtain revenue by also presenting commercial content items to the user. For example, the feedback control mechanism is applied allocate computing resources for evaluating targeting criteria and bid amounts associated with advertisements being evaluated for presentation to a user.

The feedback control mechanism may also alter the number of content items evaluated by various computing devices based on the historical revenue generated by each user. For example, the feedback control mechanism increases the number of commercial content items, such as advertisements, evaluated for display to users that have previously purchased at least a threshold number of products after interacting with commercial content items presented by the online system. Similarly, the feedback control mechanism may decrease the number of commercial content items evaluated for presentation to users that have not previously purchased at least a threshold number of products after being presented with such content.

System Architecture

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
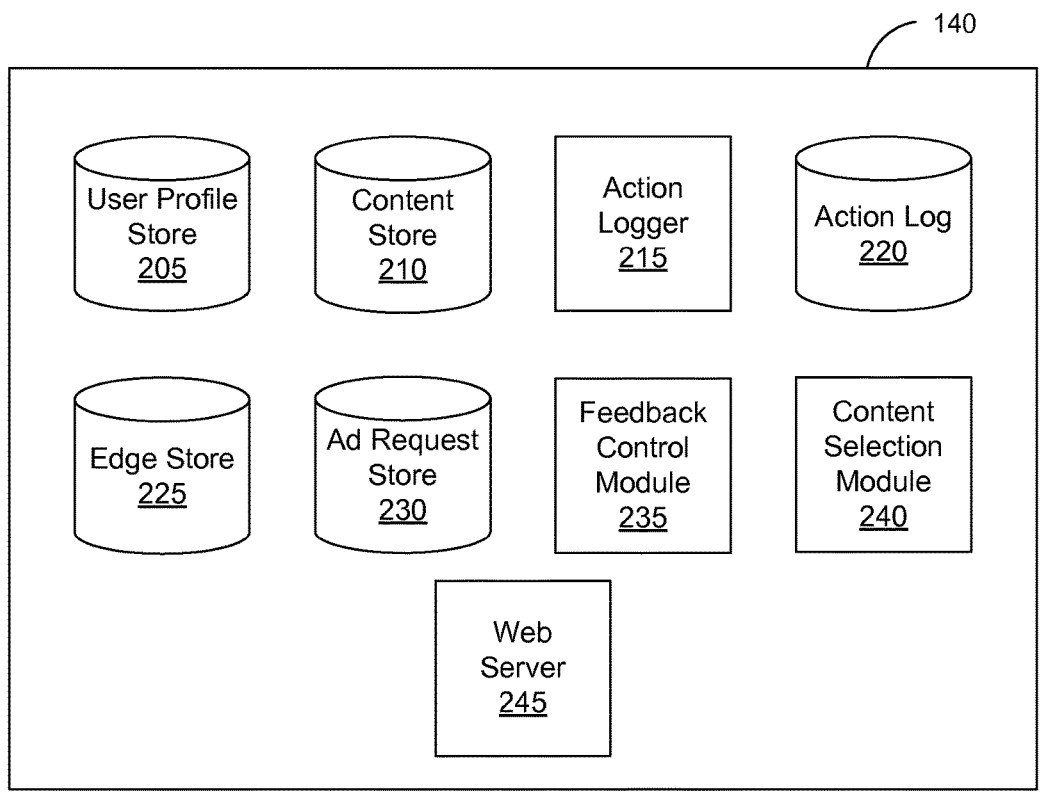
FIG. 2 is a block diagram of an online system, in accordance with an embodiment.

FIG. 2 is a block diagram of an architecture of the online system 140, which may be a social networking system in some embodiments. The online system 140 shown in FIG. 2 includes a user profile store 205, a content store 210, an action logger 215, an action log 220, an edge store 225, an ad request store 230, a feedback control module 235, a content selection module 240, and a web server 245. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or another user in the online system 140 based on the actions performed by the user. A user's affinity may be computed by the online system 140 over time to approximate a user's interest for an object, interest, or other user in the online system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad request store 230. An advertisement request includes advertisement content and a bid amount. The advertisement content is text, image, audio, video, or any other suitable data presented to a user. In various embodiments, the advertisement content also includes a landing page specifying a network address to which a user is directed when the advertisement is accessed. The bid amount is associated with an advertisement by an advertiser and is used to determine an expected value, such as monetary compensation, provided by an advertiser to the online system 140 if the advertisement is presented to a user, if the advertisement receives a user interaction, or based on any other suitable condition. For example, the bid amount specifies a monetary amount that the online system 140 receives from the advertiser if the advertisement is displayed and the expected value is determined by multiplying the bid amount by a probability of the advertisement being accessed by a user.

Additionally, an advertisement request may include one or more targeting criteria specified by the advertiser. Targeting criteria included in an advertisement request specify one or more characteristics of users eligible to be presented with advertisement content in the ad request. For example, targeting criteria are used to identify users having user profile information, edges or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in targeting criteria allows advertisers to further refine users eligible to be presented with content from an advertisement request. As another example, targeting criteria identifies users having a connection to another user or object or having a particular type of connection to another user or object.

The feedback control module 235 determines the latency period of some or all of the computing devices used by the online system 140 to evaluate content items for presentation to an online system user. For example, the online system 140 includes multiple computing devices that each evaluate content items to select content items for presentation to a user, and the feedback control module 235 periodically determines the latency period of each computing device. Based on the latency periods of various computing devices evaluating content items, the feedback control module 235 determines a target latency period in which content items are to be evaluated to select content items for presentation to a user. For example, based on latency periods sampled from each computing device selecting content items at 10-second intervals over a specified time interval (e.g., 10 minutes), the feedback control module 235 determines a target latency period of 400 milliseconds for selecting content items to present to a user. In one embodiment, the target latency period is determined as a percentile of the sampled latency periods (e.g., $99^{th}$ percentile). The feedback control module 235 also compares the target latency period to latency periods sampled from each computing device selecting content items for presentation. Based on the comparison, the feedback control module 235 allocates content items to computing devices.

In some embodiments, the feedback control module 235 includes a plurality of sub-modules that each perform the functions of the feedback control module 235 for a different set of the client devices 110. For example, if there are 1000 client devices 110, there may be a sub-module that handles one half of the client devices and another sub-module that handles the other half of the client devices. Additionally, in some embodiments, the feedback control module 235 and/or sub-modules of the feedback control module 235 may be distributed across a plurality of servers.

In one embodiment, the feedback control module 235 increases the number of content items or parameters of content items evaluated by a computing device with a latency period shorter than the target latency period until the computing device's latency period equals the target latency period or is within a threshold amount of the target latency period. The feedback control module 235 may also decrease the number of content items or parameters of content items evaluated by a computing device with a latency period longer than the target latency period until latency period of the computing device equals the target latency period or is within a threshold amount of the target latency period. For example, the feedback control module 235 computes a factor (e.g., a "PID multiplier"), and a base number of content items is multiplied by the factor to determine the number of content items to be evaluated. This determined number of content items is distributed among various computing devices for evaluation based on the sampled latency periods of each computing device. In one embodiment, the feedback control module 235 also accounts for historical interactions between a user a presented content items when distributing content items among computing devices. For example, the feedback control module 235 allocates a greater amount of content items or parameters of content items to computing devices evaluating content items presentation to user users with a history of generating at least a threshold amount of revenue through interacting with presented content items.

The content selection module 240 selects content items (e.g., ad requests from the ad request store 230) eligible for presentation to a user of the online system (i.e., candidate content items) based on targeting criteria associated with the content items. Additionally, the content selection module 240 ranks candidate content items and selects content items for presentation to the user based on their position in the ranking. Various criteria may be used to rank content items, with different criteria used to rank different types of content items. For example, advertisement requests are ranked based on their associated bid amount and/or targeting criteria, while stories or other non-commercial content items are ranked based on affinities of the user to be presented with the content item with objects or users associated with the non-commercial content items, prior user interactions with non-commercial content items, or other suitable information.

The web server 245 links the online system 140 via the network 120 to the one or more client devices 110, as well as to the one or more third party systems 130. The web server 245 serves web pages, as well as other content, such as JAVA®, FLASH®, XML and so forth. The web server 245 may receive and route messages between the online system 140 and the client device 110, for example, instant messages, queued messages (e.g., email), text messages, short message service (SMS) messages, or messages sent using any other suitable messaging technique. A user may send a request to the web server 245 to upload information (e.g., images or videos) that is stored in the content store 210. Additionally, the web server 245 may provide application programming interface (API) functionality to send data directly to native client device operating systems, such as IOS®, ANDROID™, WEBOS® or RIM®.

Determining Placement of Advertisements for Presentation

Figure 3:
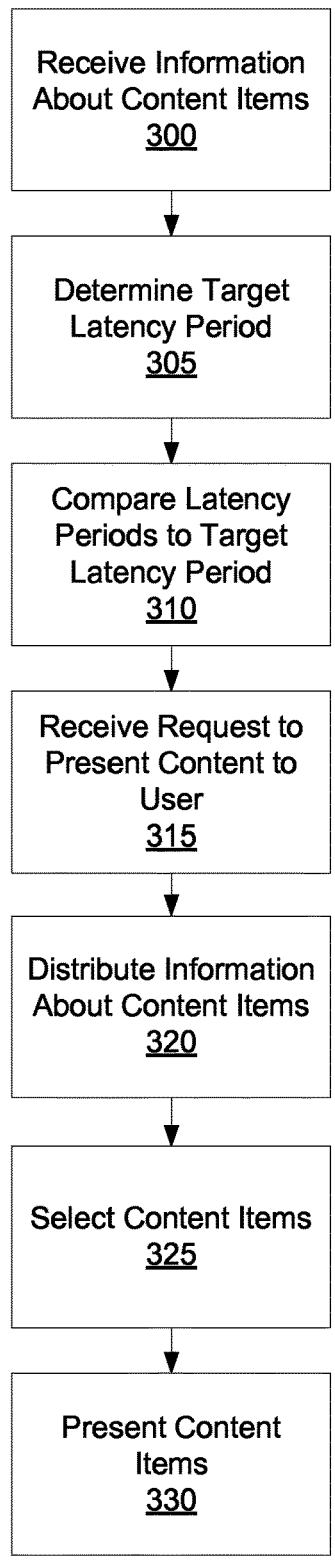
FIG. 3 is a flowchart of a method for allocating computing resources for selecting content items to present to an online system user, in accordance with an embodiment.

FIG. 3 is a flow chart of one embodiment of a method of allocating computing resources for selecting content items to present to an online system user. The online system 140 receives 300 information about content items, such as advertisement requests having targeting criteria, display times, bid amounts, etc. Additionally, the online system 140 may generate one or more content items, such as stories describing actions associated with online system users connected to a user, based on information in the action log 220 and/or in the edge store 225.

A target latency period for evaluating content items or parameters of content items is determined 305 based on latency periods of computing devices that evaluate the content items or parameters of content items. In one embodiment, the feedback control module 235 periodically samples the latency periods of some or all of the computing devices evaluating content items or parameters of content items and determines 305 the target latency period by analyzing the sampled latency periods. For example, the target latency period is determined 305 based on latency periods sampled from each device selecting content items at five-second intervals over a ten minute interval. In one embodiment, the target latency period is determined 305 as a percentile of the sampled latency periods (e.g., the 99$^{th}$ percentile of the sampled latency periods). The target latency may be stored by the online system 140 to simplify comparison of latency periods of computing devices to the target latency period.

Latency periods of various computing devices evaluating content items or parameters of content items are compared 310 to the target latency period. For example, latency periods obtained from each computing device evaluating content items for presentation are compared 310 to the target latency period. In one embodiment, the comparison determines whether a latency period of a computing device is within a threshold amount of the target latency period and determines whether the latency period is greater than or less than the target latency period. Alternatively, the comparison determines whether a computing device's latency period is greater than, less than, or equal to the target latency period.

When a request to present content to an online system user is received 315, information about content items are distributed 320 among computing devices to be evaluated to identify content items for presentation to the user. Based on the comparison of computing device latency times to the target latency device, information about content items is distributed 320 to various computing devices using a feedback mechanism. For example, if the latency period of a computing device exceeds the target latency period by a threshold amount, the number of content items or parameters of content items evaluated by the computing device is decreased from a previous number until the computing device's latency period equals, or is within the threshold amount of, the target latency period. Similarly, if the latency period of a computing device is less than the target latency period, the number of content items evaluated by the computing device is increased until the computing device's latency period equals, or is within a threshold amount of, the target latency period. In one embodiment, the feedback control module 235 distributes 320 content items, parameters of content items, or other information about content items among the computing devices based on the PID multiplier. For example, the feedback control module 235 computes a factor (e.g., a "PID multiplier"), and multiplies a base number of content items by the factor to determine the number of content items to be evaluated by various computing devices. As an example, a PID multiplier of three is determined and a base number of 100 content items is multiplied by the PID multiplier to determine that 300 content items are to be evaluated in total. The 300 information about content items is distributed 320 among various computing devices for selection for presentation based on the sampled latency periods of each computing device. In another embodiment, content items, parameters of content items (or other information about content items) are distributed 320 among computing devices based prior interactions of the user to be presented with content items and previously-presented content items. For example, a number of devices evaluating content items for presentation to a user that previously interacted with at least a threshold percentage of presented content items is increased.

Based on the evaluation by various computing devices, content items are selected 325 for presentation to the user. For example, the computing devices evaluate whether information associated with the user satisfies targeting criteria associated with various content items, evaluate whether the user has at least a threshold affinity for users or objects associated with content items, or compare information associated with the user with any suitable information associated with content items. For example, the computing devices determine whether the user satisfies one or more targeting criteria associated with ad requests or identifies ad requests having bid amounts of at least a threshold value. Content items identified by the computing devices are ranked, and content items for presentation to the user selected based on the ranking. For example, ad requests are ranked based on their associated bid amounts and/or targeting criteria, while stories or other non-commercial content items are ranked based on a user's affinity for users or objects associated with the non-commercial content items. Content items having a threshold position in the ranking or the highest-ranked content items are selected and presented to the user. In one embodiment, one or more machine-learning algorithms are used to select the content items that are communicated to a client device for presentation to a user.

SUMMARY

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Some embodiments may also relate to an apparatus (e.g., a computing device) for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Some embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments is intended to be illustrative, but not limiting, of the scope of the embodiments, which is set forth in the following claims.

What is claimed is:

1. A method comprising:
  periodically identifying, by an online system, a latency period for each of a plurality of devices of the online system that evaluate content items for selection and subsequent presentation to users of the online system, the latency period for a device of the plurality of devices corresponding to a duration between a start time and a completion time associated with the evaluation of a subset of the content items for a prior specified period of time;
  determining, by the online system, a target latency period as a function of the identified latency periods of the plurality of devices, the target latency period being updated periodically based on a corresponding prior specified period of time in which the latency period for each of the plurality of devices is being identified;
  receiving, by the online system, a request from a client device of a viewing user of the online system to present one or more content items to the viewing user, the online system being required to evaluate an amount of information in order to satisfy the request;
  responsive to receiving the request:
    determining, by the online system, a portion of the amount of information to be evaluated by each of the plurality of devices based at least in part on a comparison between the determined target latency period and the identified latency period for each of the plurality of devices, the determined amount of information corresponding to at least one of the one or more content items to be evaluated or one or more content selection parameters by which the one or more content items are collectively evaluated by the plurality of devices of the online system, determining the portion of the amount of information to be evaluated by each device comprising:
      responsive to determining that the latency period for the device is less than the target latency period, increasing the portion of the amount of information evaluated by the device, and
      responsive to determining that the latency period for the device is greater than the target latency period, decreasing the portion of the amount of information evaluated by the device;
    communicating, by the online system, the determined portion of the amount of information to each of the plurality of devices to evaluate for selecting the one or more content items for presentation to the viewing user;
  receiving one or more evaluated content items from each of the plurality of devices; and presenting at least one of the one or more received content items to the viewing user.

2. The method of claim 1, wherein the one or more content selection parameters comprise a number of content items to be evaluated for presentation to the viewing user.

3. The method of claim 1, wherein determining the portion of the amount of information to be evaluated by each of the plurality of devices for selecting the content items for presentation to the viewing user further comprises:
modifying a base amount of information evaluated by the device based at least in part on a factor determined at least in part on the comparison between the prior latency period of the device and the target latency period.

4. The method of claim 1, wherein determining the portion of the amount of information to be evaluated by each of the plurality of devices further comprises:
retrieving information describing historical interactions between the viewing user and previously presented content items; and
comparing each of the latency periods with the target latency period and the historical interactions between the viewing user and the previously presented content items.

5. The method of claim 1, wherein the target latency period is determined as a percentile of the prior latency periods.

6. The method of claim 1, wherein the content items include one or more advertisement requests, each advertisement request including an advertisement and a bid amount.

7. The method of claim 1, wherein the start time corresponds to when a request to present content items to a user of the user of the online system is received by the online system.

8. The method of claim 1, wherein the one or more content selection parameters comprise a number of content items to be ranked for presentation to the viewing user.

9. The method of claim 1, wherein the one or more content selection parameters comprise a number of targeting criteria associated with one or more content items to be evaluated for presentation to the user, and wherein the evaluation by the plurality of devices comprises determining how many of the number of targeting criteria are fulfilled by the content items.

10. A online system comprising:
a computer processor; and
a computer-readable storage medium coupled to the computer processor, the computer-readable storage medium storing executable code, the code when executed by the computer processor performs steps comprising:
periodically identifying, by an online system, a latency period for each of a plurality of devices of the online system that evaluate content items for selection and subsequent presentation to users of the online system, the latency period for a device of the plurality of devices corresponding to a duration between a start time and a completion time associated with the evaluation of a subset of the content items for a prior specified period of time;
determining, by the online system, a target latency period as a function of the identified latency periods of the plurality of devices, the target latency period being updated periodically based on a corresponding prior specified period of time in which the latency period for each of the plurality of devices is being identified;
receiving, by the online system, a request from a client device of a viewing user of the online system to present one or more content items to the viewing user, the online system being required to evaluate an amount of information in order to satisfy the request;
responsive to receiving the request:
determining, by the online system, a portion of the amount of information to be evaluated by each of the plurality of devices based at least in part on a comparison between the determined target latency period and the identified latency period for each of the plurality of devices, the determined amount of information corresponding to at least one of the one or more content items to be evaluated or one or more content selection parameters by which the one or more content items are collectively evaluated by the plurality of devices of the online system, determining the portion of the amount of information to be evaluated by each device comprising:
responsive to determining that the latency period for the device is less than the target latency period, increasing the portion of the amount of information evaluated by the device, and
responsive to determining that the latency period for the device is greater than the target latency period, decreasing the portion of the amount of information evaluated by the device;
communicating, by the online system, the determined portion of the amount of information to each of the plurality of devices to evaluate for selecting the one or more content items for presentation to the viewing user;
receiving one or more evaluated content items from each of the plurality of devices; and
presenting at least one of the one or more received content items to the viewing user.

* * * * *